(12) United States Patent
Kaufman et al.

(10) Patent No.: US 9,392,497 B2
(45) Date of Patent: Jul. 12, 2016

(54) CIRCUIT SWITCH FALLBACK (CSFB) FOR AN LTE MOBILE NETWORK

(71) Applicant: StarHome GmbH, Zurich (CH)

(72) Inventors: Eran Kaufman, Tel-Aviv (IL); Shai Ophir, Moshav Ein-Vered (IL); Michael Semama, Revava (IL)

(73) Assignee: StarHome GmbH, Zurich (CH)

( * ) Notice: Subject to any disclaimer, the term of this patent is extended or adjusted under 35 U.S.C. 154(b) by 0 days.

(21) Appl. No.: 14/445,428

(22) Filed: Jul. 29, 2014

(65) Prior Publication Data

US 2015/0031357 A1     Jan. 29, 2015

Related U.S. Application Data

(60) Provisional application No. 61/859,330, filed on Jul. 29, 2013.

(51) Int. Cl.
| | |
|---|---|
| *H04W 36/00* | (2009.01) |
| *H04W 60/04* | (2009.01) |
| *H04W 88/16* | (2009.01) |

(52) U.S. Cl.
CPC .......... *H04W 36/0022* (2013.01); *H04W 60/04* (2013.01); *H04W 88/16* (2013.01)

(58) Field of Classification Search
USPC ................... 370/331, 328, 329; 455/436, 458
See application file for complete search history.

(56) References Cited

U.S. PATENT DOCUMENTS

| | | | | |
|---|---|---|---|---|
| 2011/0217979 A1* | 9/2011 | Nas | ......................... | H04W 4/00 455/433 |
| 2012/0142341 A1* | 6/2012 | Nagpal | ................. | H04W 48/18 455/426.1 |
| 2012/0302234 A1* | 11/2012 | Wallis | ............... | H04W 36/0022 455/433 |
| 2013/0237213 A1* | 9/2013 | Tian et al. | .................. | 455/432.1 |
| 2013/0259001 A1* | 10/2013 | Keller | ................. | H04W 76/027 370/331 |
| 2015/0229491 A1* | 8/2015 | Solovyev | ............ | H04L 65/1016 370/328 |
| 2015/0257043 A1* | 9/2015 | Wallis | ............... | H04W 36/0022 455/436 |

FOREIGN PATENT DOCUMENTS

| | | |
|---|---|---|
| WO | WO 2012/045377 | 4/2012 |
| WO | WO 2012/162636 | 11/2012 |

OTHER PUBLICATIONS

3GPP TS 23.272 V10.9.0 (Dec. 2012) Circuit Switched (CS) fallback in Evolved Packet System (EPS); Stage 2 (Release 10).*

(Continued)

*Primary Examiner* — Nathan Taylor

(57) ABSTRACT

CSFallback controller allows a long term evolution (LTE) supporting telephone handset to communicate over a network that does not support LTE voice calls, using circuit-switch fallback (CSFallback). The CSFallback controller comprises a visited side signaling output to provide visited side signaling to respond to a mobile terminated call to an mobile handset supporting LTE by locating said handset and an MSC currently serving said handset, using an emulation of HLR signaling for locating the handset and the MSC and a home side signaling output, to provide home side signaling to an HLR associated with the handset. The home side signaling is an emulation of signaling from a serving MSC. The controller transfers the call for handling by the identified currently serving MSC.

10 Claims, 9 Drawing Sheets

(56) References Cited

OTHER PUBLICATIONS

Circuit-switched fallback. In collaboration Qualcomm and Ericsson.*

European Search Report and the European Search Opinion Dated Dec. 23, 2014 From the European Patent Office Re. Application No. 14178940.4.

* cited by examiner

CIRCUIT SWITCH FALLBACK (CSFB) FOR AN LTE MOBILE NETWORK

RELATED APPLICATION

This application claims the benefit of priority under 35 USC §119(e) of U.S. Provisional Patent Application No. 61/859,330, filed Jul. 29, 2013, the contents of which are incorporated herein by reference in their entirety.

FIELD AND BACKGROUND OF THE INVENTION

The present invention, in some embodiments thereof, relates to a system, apparatus and method for circuit switch fallback (CSFB) for a long term evolution (LTE) mobile network and, more particularly, but not exclusively, to a way of providing CSFB without needing to change or upgrade existing 2G or 3G components.

LTE, otherwise known as fourth generation or 4G, is slowly being implemented in cellular telephone networks around the world. LTE is also defined to use a form of Voice Over IP (VOiP) known as Voice over LTE (VoLTE) in order to carry voice calls, so that the LTE network is entirely packet switched and does away with circuit switching altogether.

However the underlying networks do not necessarily yet support VoLTE, or may be slow to implement VoLTE due to the small proportion of subscribers currently having LTE-enabled handsets.

Thus, when deploying an LTE (4G) network, the mobile network operator (MNO) (mobile operator) has two options in general, related to voice call support. First of all it is possible to directly implement VoLTE (Voice over LTE). However alternatively it is possible to use circuit switch fallback (CSFB) to cause the network to take the signals from the phone and treat them as 3G/GSM/CDMA signals. Fallback may be carried out for voice calls and potentially also for SMS. Thus, whenever the handset makes a call (MO—Mobile Originated) or receives a call (MT—Mobile Terminated), the handset switches to 3G or one of the other protocols as available, using the CSFB procedure.

The CSFB requires the network mobile switching center (MSC) and the network visitor location register (VLR) elements to upgrade to support LTE, so they can communicate with the mobile management entity (MME). The MME is an LTE entity which manages the mobility of the device, and in the case of fallback triggers the MSC to register the device for 3G operation as well. The device is normally in 4G mode and there is no radio connection to the 3G components.

The fallback issue applies as much to mobile telephones located in their own networks, as to mobile telephones roaming in other networks. As will be explained below, however, some of the present solutions cause additional problems for roaming users.

Referring now to FIG. 1, mobile network 2 includes a 2G/3G track 4 with GSM compatible components, and an LTE track 6 with LTE components. An LTE enabled handset 10 registers at MME 12, which is the LTE equivalent of the MSC included in the mobile switching server MSS 14, where the 3G and 2G handsets register. The LTE handset places a call using CSFB, since it does not support VoLTE. The MME has to register the handset via a secondary registration at the MSC and then the call is forwarded as a regular circuit-switched call carried out over the 3G infrastructure.

The LTE track 6 uses Internet Protocol IP to communicate, and operates via the Internet, shown as 16. The 2G/3G track 4 uses an operator IP network and uses a combination of protocols including GSM (or CDMA) and GPRS to communicate.

Nokia Corp. has implemented a CSFB solution in a single box, referred to as the MSC Overlay that eliminates the need to upgrade the MSCs. However the MSC overlay solution suffers from the disadvantage that it is not scalable, and cannot serve a large number of subscribers. This is due to the fact that it needs to receive the actual mobile terminated calls, which it does via ISUP IAM, and this significantly limits the capacity of the MSC overlay solution. In the MSC overlay solution a single unit talks to the MMEs and acts as a fallback MSC for the entire network. In this way there is no need to upgrade individual MSCs.

Another LTE issue, which is related to CSFB as well, is the misalignment between the 4G MMEs and 3G MSCs coverage areas.

As shown in FIG. 2, there are two pool areas, pool area 1 and pool area 2, each area having its own MSC and its own MME. Pool area 1 has MSC1 and MME1, and pool area 2 has MSC2 and MME2. Each pool area is covered by a set of GSM coverage areas, LA1, LA2, LA3, and by a set of LTE coverage areas TA1, TA2, TA3. Handset 22 is located in the boundary region between the two pool areas.

While an incoming call arrives at MSC1, MSC1 sends a paging signal to MME1, either knowing or suspecting that an LTE handset is involved. The MME pages the local TA's for the phone. The handset falls back to 3G, but because the handset is located on the coverage boundary the 3G communication is equally likely to be picked up by MSC2. The result is a need for a re-registration of the device to MSC2, during an incoming voice call.

In general boundaries are fuzzy, especially in urban areas. The handset may move to MME2 but with no guarantee as to when it will be registered with MSC2, because the coverage areas do not overlap by 100%.

The mismatch leads to a roaming retry, and the call cannot be connected until a match is made.

Referring to FIG. 3, one reason for the misalignment is that the LTE areas may be of different size than the 3G areas. Here the LTE areas are shown as smaller, but the opposite may be true.

As shown in FIG. 3, the LTE regions do not line up with the 3G regions. Arrow 30 illustrates the movement of the handset between different MSC servers. If CSFB switching is carried out from one LTE cell in one TA to 3G cell in another LA where the current handset is not registered, a new location area update (LAU) must be carried out prior to executing the connection setup. The LAU may add a one to two second delay depending on the network loading.

Returning to the case of re-registration to another MSC during a call, the LAU and an update to the home location register (HLR) has to occur between different MSC servers prior to connection setup. Such a mobile terminated roaming retry procedure can add up to four or five seconds delay to the call set up time, depending on network loads.

FIG. 4 illustrates the mismatch and roaming retry procedure with the new LAU. The handset is initially paged at the old MSC which finds nothing and times out. When paging finds the handset at the new MSC, an authentication procedure and update location is carried out. The procedure connects the call to the handset but the delay is noticeable. The handset is paged from the old MSC to go to fallback, and then the old MSC notices that the phone is not there. Had the handset been at the old MSC the fallback would have worked to connect correctly. However as the handset is not to be found in the old MSC, the location update reaches a new MSC. The handset now has to do authentication and the call is passed to the new location.

At this point the old MSC knows about the new MSC, and sends the call back to the gateway MSC (GMSC) to look again for the new MSC. The call is connected, but at the cost of some considerable delay experienced by the caller until a connection is eventually made.

In roaming the delay is worse since the connection between the MSC and the GMSC is an international connection.

A theoretical solution is provided in the standard and provides for full communication between the VPMN and the HPMN via an interface known as the E interface. However the E interface is not implemented on any currently known products.

An alternative solution, known as MTRF, is shown in FIG. 5. In this case, the new MSC, upon paging the LTE handset, requests the call to be passed from the old MSC directly to the new MSC. At the same time the new MSC sends an update to the HLR, and tells the HLR that it supports MTRF. The HLR receives the update and instructs the old MSC to pass the call to the new MSC.

The MTRF solution requires integration at both sides, the visited side and the home side and in the case of roaming, the HPMN side and the VPMN side, which are different networks, so it is unlikely to be applicable to random combinations of home and visited networks, which is what most roaming consists of.

In summary, roaming retry requires a second location update, causing considerable delay, especially in roaming. Roaming retry, and MTRF both require integration at both the VPLMN and the HPLMN.

SUMMARY OF THE INVENTION

The present embodiments may provide an improved solution for the roaming retry procedure. The various embodiments are relevant for both international roaming and domestic roaming within the same local network, where the handset moves between network cells. The apparatus, referred to hereinafter as a CSFB controller is also able to communicate with unmodified MSC and other units as necessary to provide the overlay, hence functions as an MSC Overlay, but merely controls signaling and does not actually manage the calls and thus avoids capacity limitations. The present solution is also very relevant to LTE networks which have already upgraded all MSCs to support CSFB. No additional time delays beyond those intrinsic to the network are introduced and no existing units need to be upgraded.

According to an aspect of some embodiments of the present invention there is provided network apparatus for LTE support using CSFallback, the apparatus comprising:

a visited side signaling output configured to provide visited side signaling to respond to a mobile terminated call to mobile handset supporting LTE by finding, or specifically paging, the handset and causing the handset to provide a location update via an MSC, then finding the MSC based on location update signaling, the MSC thus being identified as currently serving the handset, the visited side signaling comprising an emulation of HLR signaling for locating the handset and the MSC; and a home side signaling output, configured to provide home side signaling to an HLR associated with the mobile handset, the signaling comprising an emulation of signaling from a serving MSC, wherein the apparatus is configured to transfer the mobile terminated call for handling by the identified currently serving MSC.

In an embodiment, the visited side signaling output is configured to trigger an update location from the telephone handset to find the currently serving MSC.

An embodiment may provide an apparatus network address, and the home side signaling output may be configured to provide the apparatus network address as a serving MSC address to the HLR and to retain an actual serving MSC address for use by the visited side signaling output.

As an alternative, an apparatus network address may be is preset at the HLR, and the HLR may retain an actual serving MSC address for use by the visited side signaling output.

An embodiment may respond to the call by withholding a provide roaming number —PRN— request, paging the telephone handset to determine a serving MSC and then providing to the determined MSC one member of the group consisting of a delayed version of the PRN request and a new PRN request, prior to the transferring the call.

In an embodiment, the telephone handset is roaming in a network other than the network hosting the corresponding home location register, the visited side signaling output being configured to provide signals to initially forward the mobile terminated call to a known MSC, and subsequently, if the known MSC is found to be other than the currently serving MSC, to forward control of the mobile terminated call from the known MSC to the currently serving MSC.

In an embodiment, the telephone handset is roaming in a network other than the network hosting the corresponding home location register, the visited side signaling output being configured to provide a provide roaming number request to a currently known serving VLR and to forward a call thereto, and in the event of a location update coming from the telephone handset arriving via a different VLR, sending a cancel signal to the currently known serving VLR to retrieve the call, and cause the currently known VLR to communicate with the different VLR, the apparatus then configured to forward the call to the different VLR.

According to a second aspect of the present invention there is provided a method for providing long term evolution (LTE) support of calls using circuit-switch fallback (CSFallback), the method comprising:

providing visited side signaling to respond to a mobile terminated call to a mobile handset supporting LTE by finding, or specifically paging, the handset and causing the handset to send an update location, then finding the serving MSC based on location update signaling, the update location identifying an MSC as currently serving the handset, the visited side signaling comprising an emulation of HLR signaling for locating the handset and the MSC;

providing home side signaling to an HLR associated with the mobile handset supporting LTE, the signaling comprising an emulation of signaling from a serving MSC; and providing the call to the currently serving MSC.

In an embodiment, the visited side signaling triggers an update location from the telephone handset to find the currently serving MSC.

An embodiment may comprise:

providing a predetermined first network address as a serving MSC address to the HLR; and retaining an actual serving MSC address for the visited side signaling.

An embodiment may comprise:

providing a register;

providing a register address that is preset at the HLR; and retaining an actual serving MSC address for the visited side signaling.

An embodiment may comprise:

responding to the call by withholding a provide roaming number —PRN— request;

paging the LTE telephone handset to determine a serving MSC; and providing the PRN request after delay to the determined MSC or providing a new PRN request to the determined MSC.

An embodiment may comprise:

providing a register at a first network, wherein the telephone handset is roaming in the first network, the first network being a network other than a network hosting the corresponding home location register;

forwarding the call via a currently serving MSC;

receiving an update location from the handset;

noticing that the update location indicates an MSC which is different from a currently serving MSC; and providing signals to cancel the currently serving MSC and cause the currently serving MSC to forward control of the mobile terminated call to the different MSC.

An embodiment may comprise:

providing a register at a first network, wherein the telephone handset is roaming in the first network, the first network being a network other than a network hosting the corresponding home location register;

providing a provide roaming number —PRN— request to a currently known serving MSC;

on acknowledgement of the PRN request, forwarding the call to the currently serving MSC; and in the event of a location update coming from the LTE telephone handset arriving via a different MSC:

sending a cancel signal to the currently known serving MSC;

retrieving the call;

signaling the different MSC to assume control of the mobile terminated call; and forwarding the retrieved call to the different MSC.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
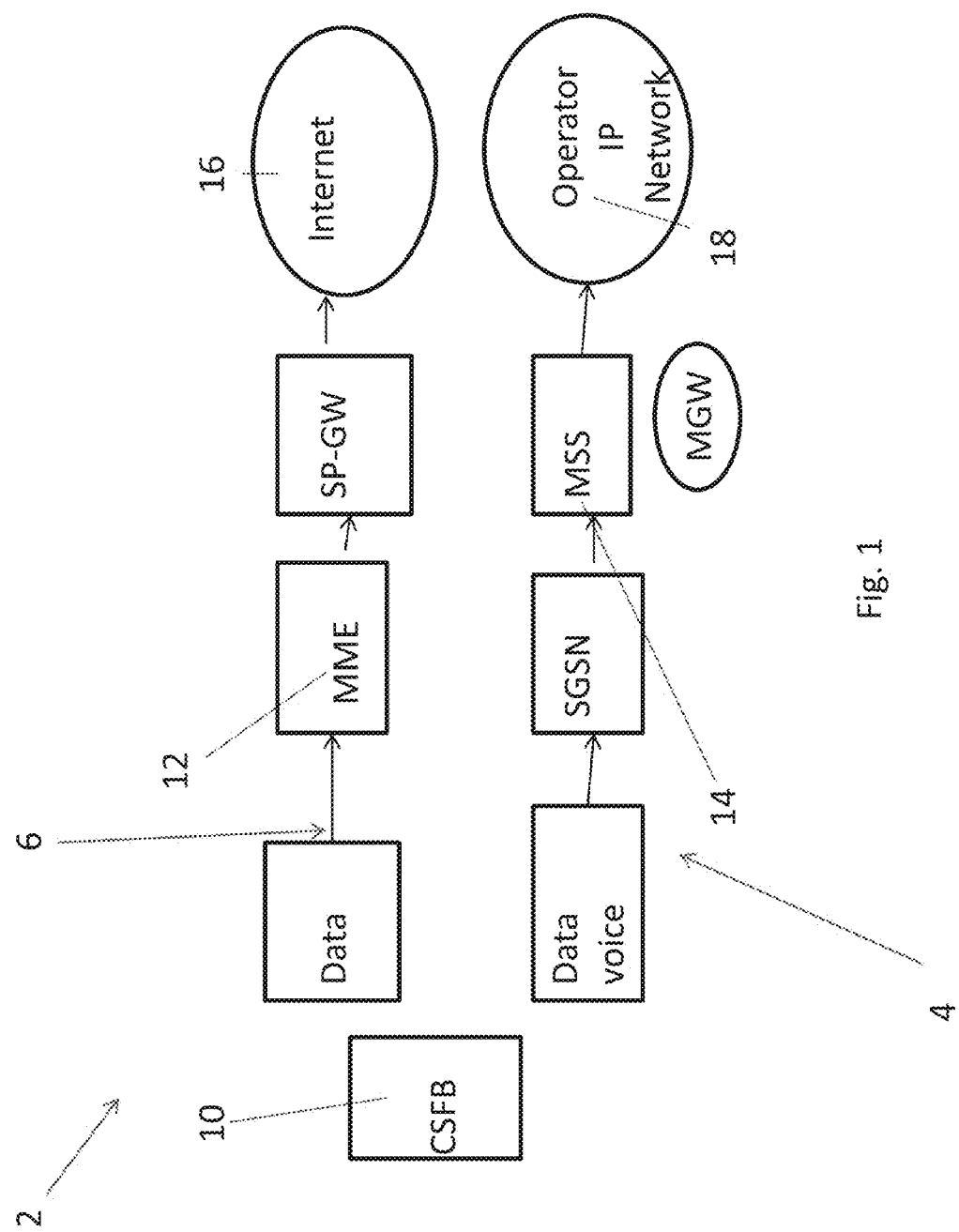
FIG. 1 is a simplified block diagram illustrating a cellular network for which the present embodiments are intended, the network having both LTE and 2G/3G elements side by side but whose LTE pathway is unable to support VoLTE—based voice calls.
Figure 2:
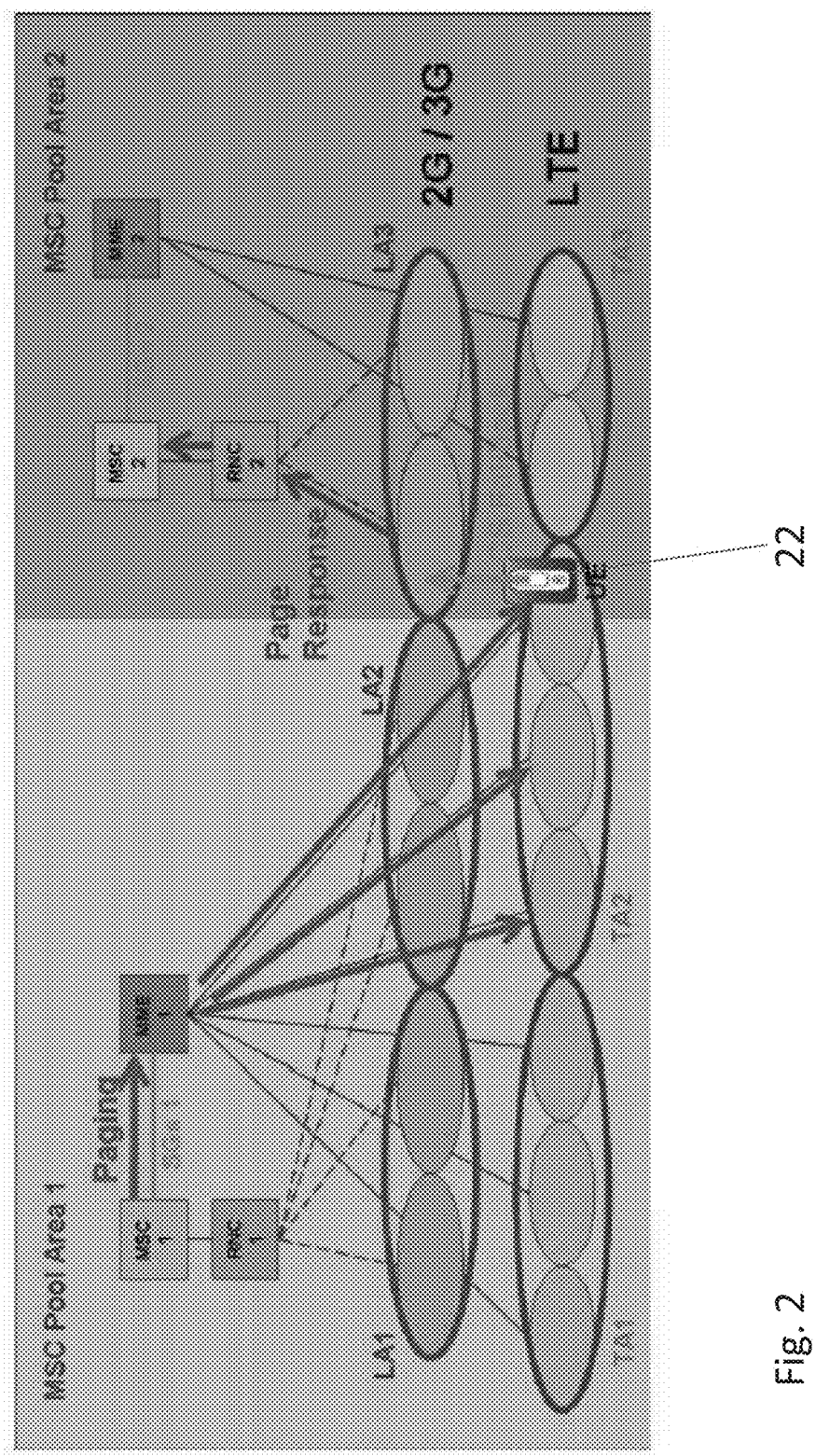
FIG. 2 is a simplified schematic diagram illustrating boundary misalignment between MME and MSC areas in the network of FIG. 1.
Figure 3:
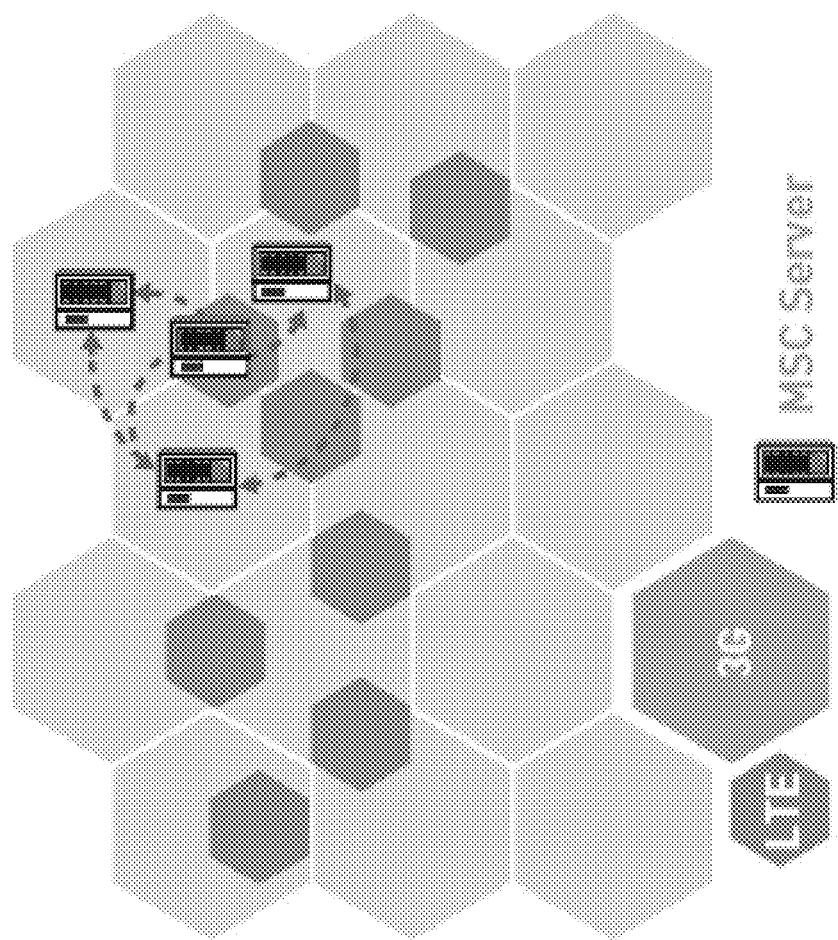
FIG. 3 is a simplified diagram illustrating misalignment between MME and MSC reception areas due to different configurations.
Figure 4:
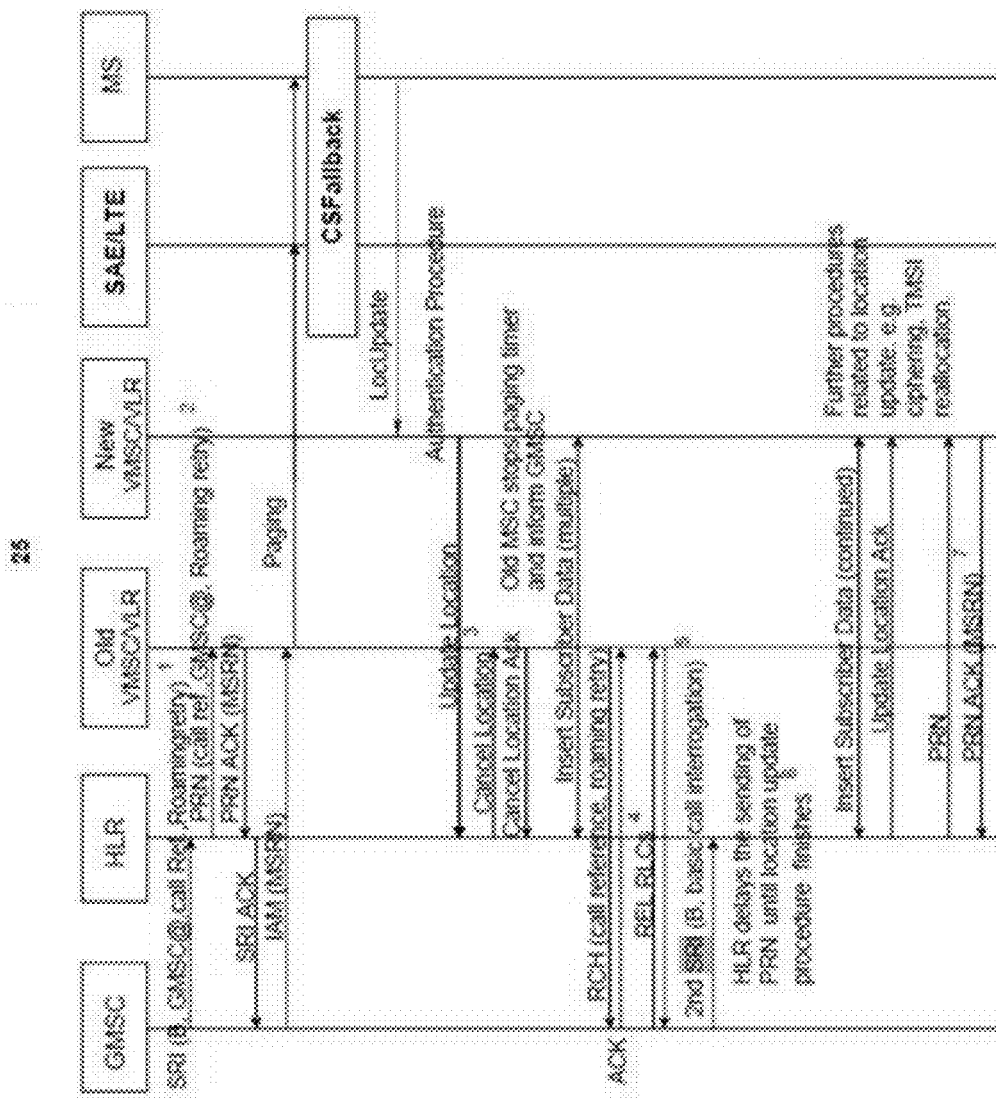
FIG. 4 is a simplified signal diagram illustrating the prior art method of roaming retry to overcome the misalignment problem as exemplified by FIGS. 2 and 3.
Figure 5:
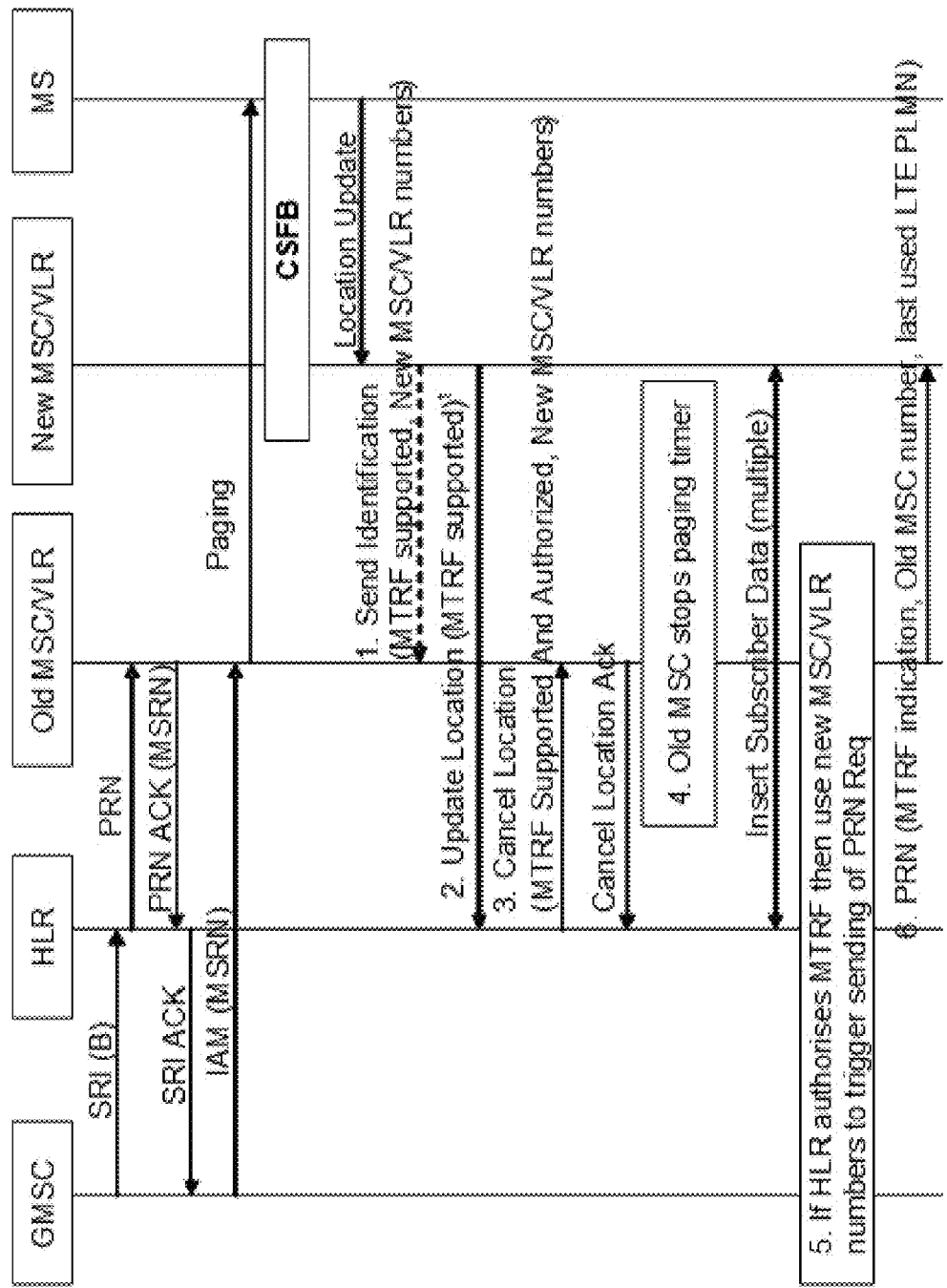
FIG. 5 is a simplified signal diagram illustrating the prior art MTRF method to overcome the misalignment problem as exemplified by FIGS. 2 and 3.

The present invention, in some embodiments thereof, relates to a system, apparatus and method for circuit switch fallback (CSFB) for a long term evolution (LTE) mobile network and, more particularly, but not exclusively, to a way of providing CSFB without needing to change or upgrade existing 2G or 3G components. It is noted however that the embodiments can usefully be utilized by 2G or 3G components which have been upgraded to support CSFB.

In part of the present embodiments, the CSFB controller is located in the network to mediate between visited-side network components and home-side network components. The apparatus provides signaling to each of the two sides to emulate the other side and control transfer of the call between the various visited-side components without requiring the intervention of the home-side components. This applies both in the cases of the phone being at the home network and at a separate, roaming network.

More particularly, the LTE handset is connected to the local MME. The network circuit switched voice connections however work via the MSCs, and the MMEs and MSCs may not be aligned, as discussed in the background. The apparatus of some of the present embodiments emulates the visited side of the network to the home side of the network and the home side of the network to the visited side of the network in order to manage the 3G telephony components at the visited side during CSFallback, which is a time at which the LTE handset requires the 3G network components.

The present apparatus merely passes signals for control of the call and does not take on the task of the MSC in controlling the call, thus avoiding onerous requirements for capacity.

Now often, within a particular network, prior art systems for managing the 3G control may have been implemented, such as the MTRF systems discussed. However, often the handset is roaming outside of its native network, that is to say in a network other than the network on which its HLR is located. This may particularly occur in the case of the subscriber being in another country. In this case, the improvements at the roaming network are unlikely to be compatible with the home network, and even if they are, there is the possibility that the special signaling required may not be passed intact over the international connections.

Thus the present embodiments cater in particular for the roaming case. The apparatus may serve as a global location register, acting as a single point of contact to the home location registers for all roaming handsets and managing the communication with the individual MSCs without involving the home network at all. In addition, the apparatus may then provide the signaling for managing call transfer between the MSCs based on the most recent handset location update.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 6:
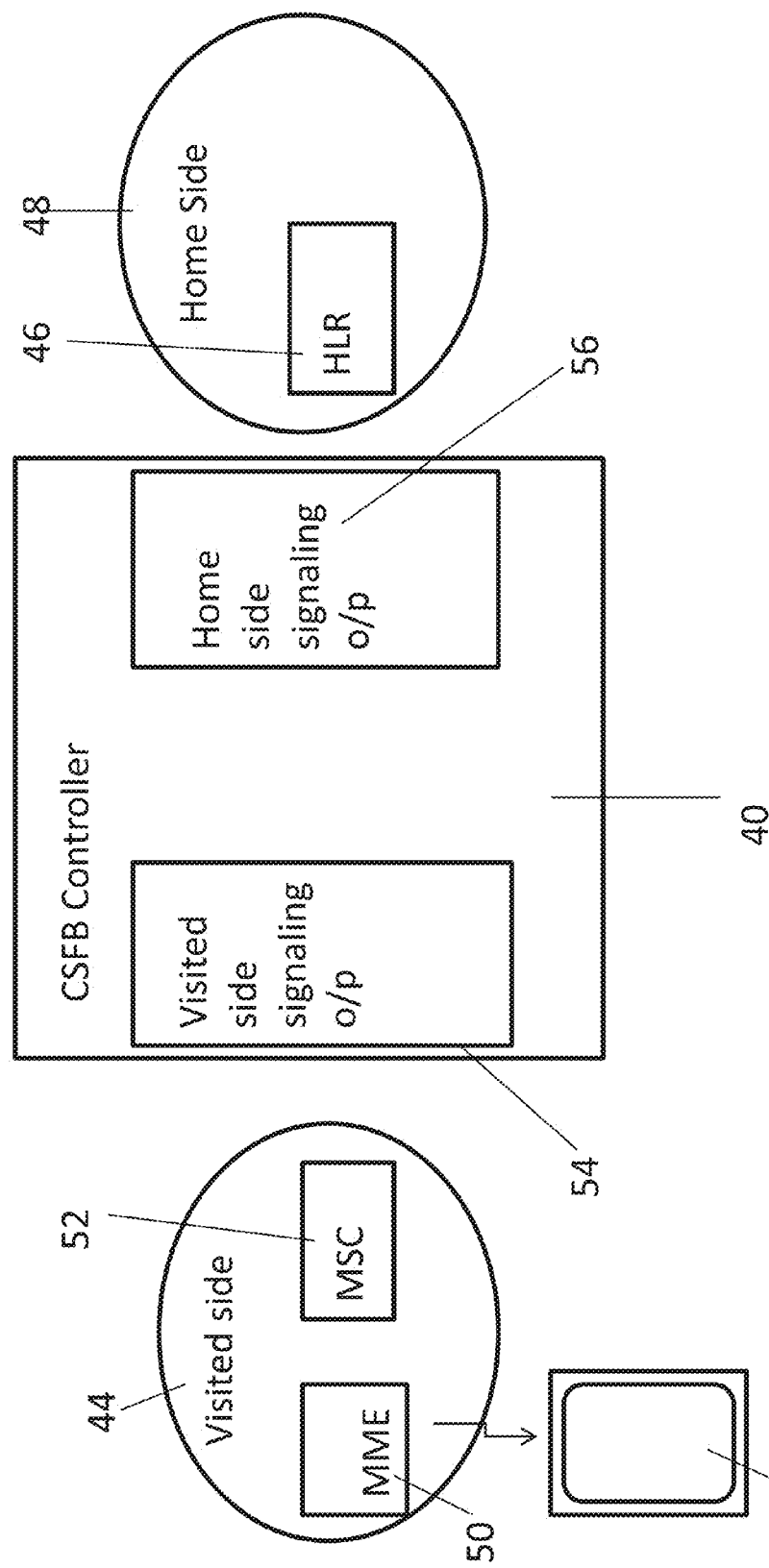
FIG. 6 is a simplified block diagram showing a CSFB controller according to an embodiment of the present invention, connected into a network such as the network of FIG. 1.

Reference is now made to FIG. 6, which is a simplified diagram illustrating network apparatus for allowing a long term evolution (LTE) telephone handset to communicate over CSFB. The LTE handset may be designed to place voice calls using a Voice over LTE (VoLTE) packet switched protocol which is intended to use LTE infrastructure, but the LTE may support the CSFB mechanism for cases where the network does not support VoLTE. The network, however, is equipped with legacy circuit-switching 3G equipment for voice calls, although the handset itself connects to the network using LTE modules such as the MME. When an LTE handset attempts to place a voice call, and the network has not yet been updated to handle VoLTE, the handset falls back to circuit switching (CS), and the MME hands over the call to the nearby MSC for handling as a circuit switched call, in the procedure known as circuit-switch fallback (CSFallback).

The CSFB controller 40 is located on the network to which the LTE handset 42 is connected. The LTE handset 42 is located on the visitor side 44 of the network, and the corresponding home location register (HLR) 46 is located on the home side 48 of the network. As mentioned visitor side 44 and home side 48 may be different networks in the case of roaming, but can also be parts of the same domestic network, where the visitor side is the roaming between cells, managed by the VLR (Visitor Location Registry) or the MME in case of LTE The visited side 44 includes an MME 50, which is part of the LTE infrastructure and to which handset 42 connects. MSC 52 is part of the 3G infrastructure and handset 42 does not connect directly to MSC 42. However MSC 52 is the component that manages the call during CSFallback.

Controller 40 includes a visited side signaling output 54, which emulates HLR signaling to manage the visited side 44 of the network. In addition, controller 40 includes a home side signaling output 56, which emulates MSC signaling so that the HLR sees a fully functioning MSC for the duration of the call.

Figure 8:
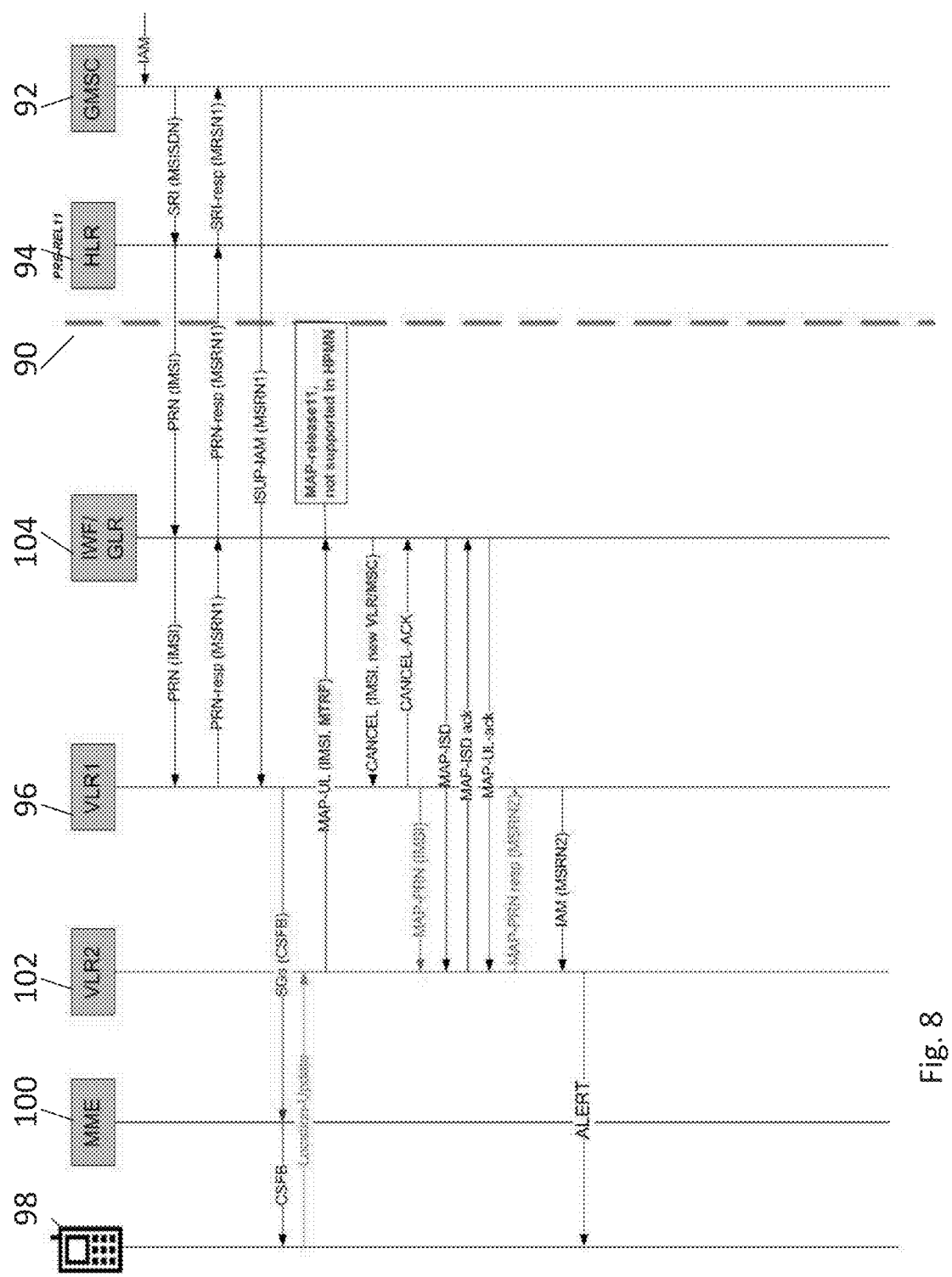
FIG. 8 is a simplified diagram showing operation of the CSFB controller of FIG. 6 for the case of roaming, the controller controlling a first MSC to forward call management to a second MSC, particularly in a case where MTRF is supported at the roaming but not at the home network.

More particularly, the visited side signaling output 54 may provide visited side signaling, in emulation of an HLR or in emulation of a GMSC—see FIG. 8, to provide an appropriate response to a mobile terminated call that is directed to a mobile handset supporting LTE 42. The response may involve locating handset 42 and that includes identifying the MSC 52 currently serving the handset. In the event that the MSC that responds to a request to page the phone is not the currently registered MSC, or in the case that no MSC is currently registered, then the visited side signaling output manages the secondary registration of the handset at the MSC, or manages the transfer of the call management from the MSC initially identified to the MSC that relayed the update location. The transfer or registration is carried out in emulation of the HLR, which conventionally would manage such a process, however in this case the HLR does not get involved in the call management transfer as the CSFB controller 40 takes over.

The home side signaling output 56 provides home side signaling to HLR 46 in a way that emulates signaling from a serving MSC. Thus the CSFB controller is able to manage the visited side signaling while satisfying the HLR that nothing out of the ordinary is taking place.

The visited side signaling output 54 may find the handset 42 by triggering an update location from the LTE telephone handset 42. The update location then identifies the MSC through which the update location was relayed, which identified MSC is therefore the serving MSC.

CSFB controller 40 may be assigned its own network address. In some embodiments the home side signaling output 56 provides that network address as a serving MSC address to the HLR 46, and retains the actual serving MSC address solely to be used by the visited side signaling output 54.

The CSFB controller 40 may be operated as a global location register. A global location register is a proxy MSC for roaming users, so that a home network sees only a single location on the whole network, and the global location register then manages handovers between individual MSCs without referring to the home network. In the present case the CSFB controller becomes a global location register for roaming LTE handsets, to transfer call management between MSCs in the course of CSFB. The global location register retains the address of the actual serving MSC for use by the visited side signaling output, and the home network uses the address of the CSFB controller 40.

Figure 7:
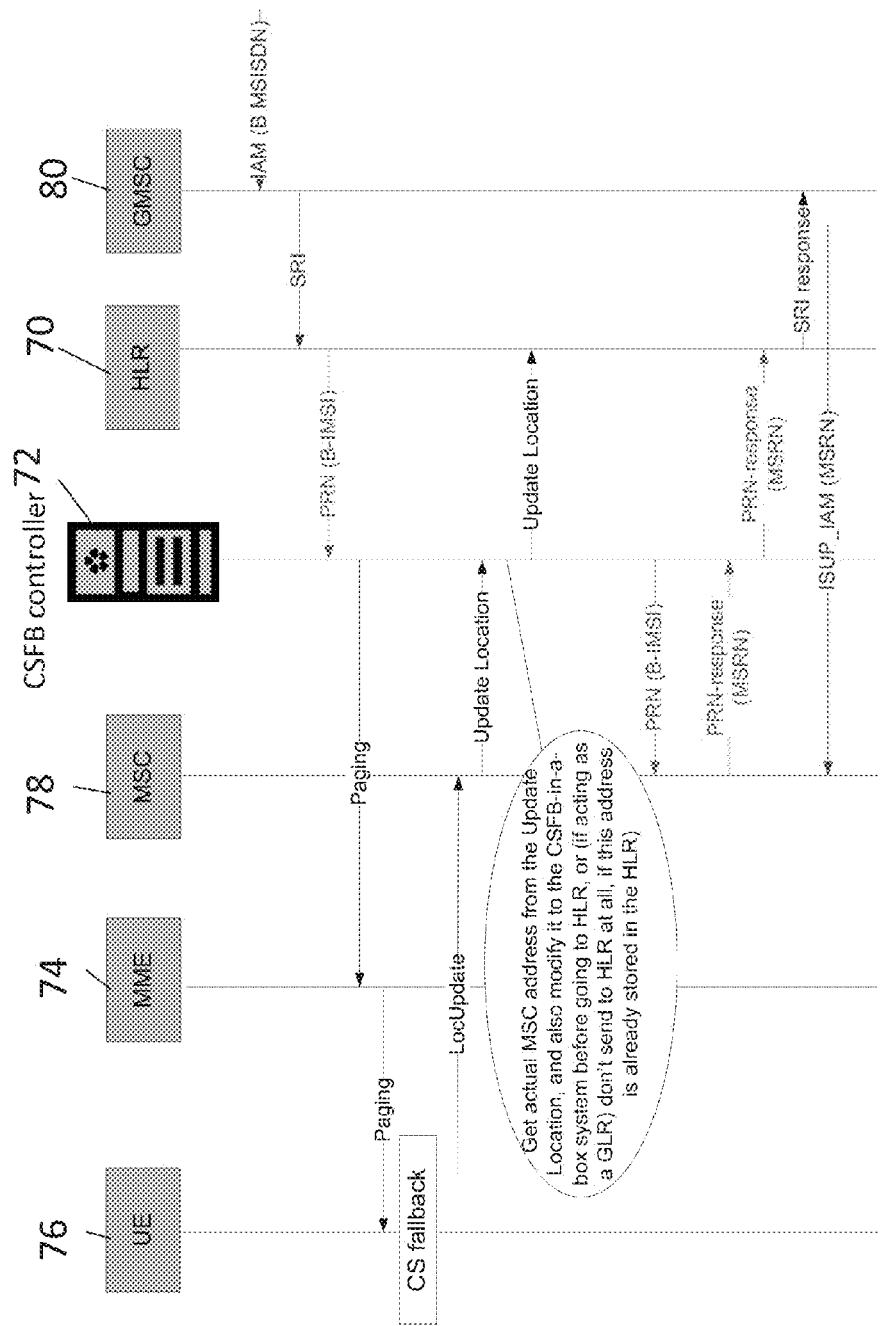
FIG. 7 is a simplified signal diagram showing operation of the CSFB controller of FIG. 6 mediating between visited and home sides of a network such as the network shown in FIG. 1.

In one embodiment, as shown in FIG. 7 discussed below, a mobile terminated call is notified to the CSFB controller 40 in the form of a provide-roaming-number —PRN— request. The controller 40 withholds the PRN request and instead pages the LTE telephone handset via the currently serving MME, which it knows about. The handset responds by sending a location update, but the location update is received by the actual serving MSC, which was previously unknown. The controller thus identifies the serving MSC and sends a PRN request to the identified MSC. The PRN request results in a PRN response which can then be sent on to the HLR via the controller. The PRN response as received at the controller will include the actual MSC address.

The PRN as sent to the MSC may be the originally received PRN which has been delayed, or it can be a new PRN request generated by the CSFB controller.

As mentioned, in the case of roaming, the CSFB controller may be set up as a global location register for the LTE telephones. The visited network signaling output may provide signals to forward control of the mobile terminated call from a previously serving VLR to a currently serving visitor location register (VLR). Control of the call management is initially provided to the previous VLR by passing on the PRN signal. As discussed in greater detail below in respect of FIG. 8, the handset subsequently provides a location update, which is received and passed on from a different VLR. The visited network may be equipped with the MTRF solution but even so the home network may not be so equipped, or there may not be MTRF integration in place between the two networks, so when the new VLR sends the MTRF compatible signal indicating that control should be passed to it, the message is not received by the HLR. Instead the controller cancels the registration at the first VLR assists the transfer of the call management from the first VLR to the second VLR, for example using a MAP PRN signal.

An alternative roaming scenario is discussed below in respect of FIG. 9. Again the controller provides a global location register for the LTE roaming handsets on the network. The visited side signaling output passes on the roaming number request to the currently known serving VLR. Then, when a location update coming from the LTE telephone handset happens to arrive via a different VLR, the controller sends a cancel signal to the currently known serving VLR, which then issues a resume call handling signal. In this scenario the resume call handling signal is not supported by the home network but the controller replaces the missing support of the home network, and signals the different VLR to assume management of the mobile terminated call.

Figure 9:
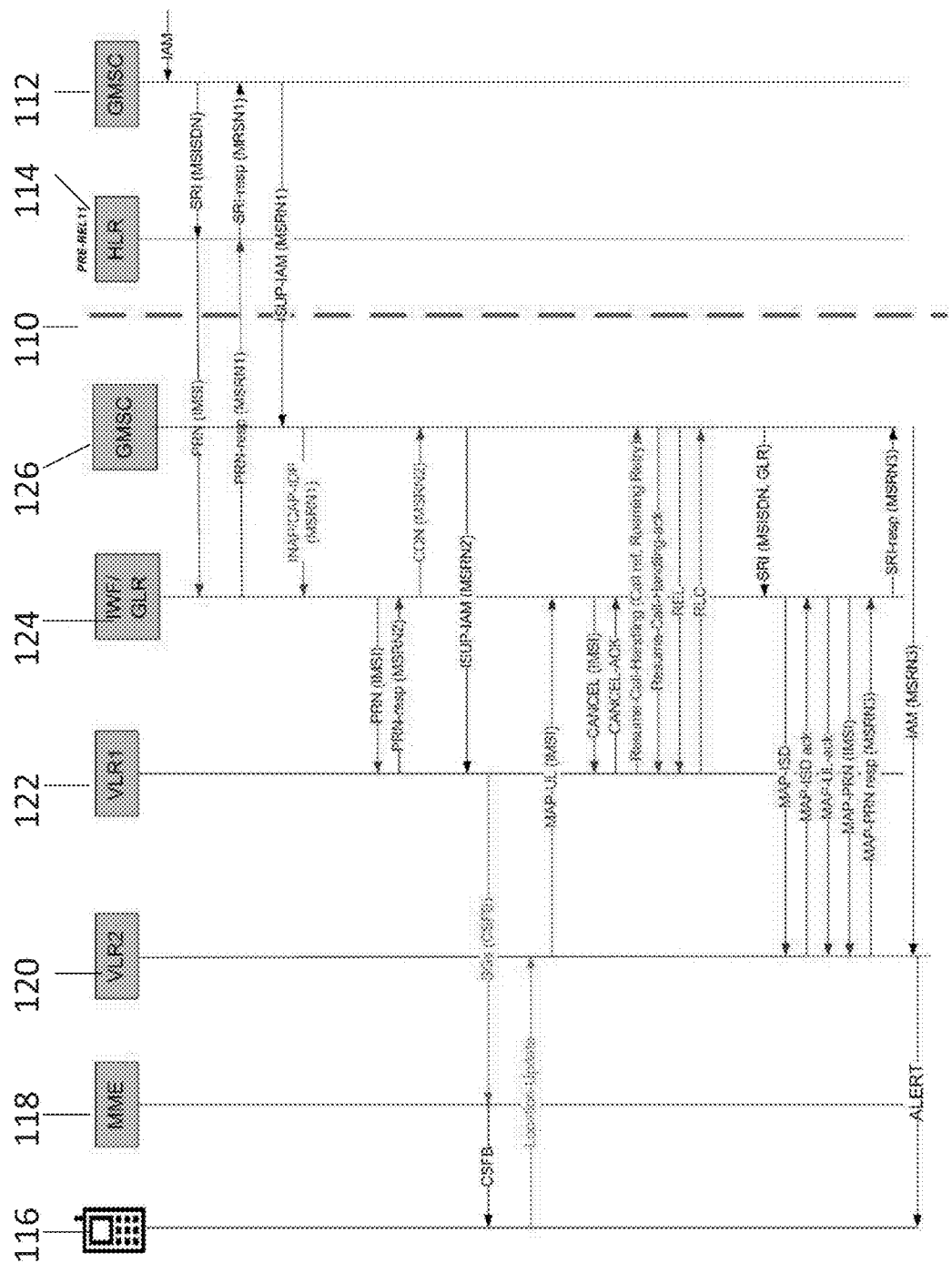
FIG. 9 is a simplified diagram showing operation of the CSFB controller of FIG. 6 to carry out roaming retry to pass call management from a first MSC to a second MSC, particularly in the case where resume call handling is supported by the roaming network but not by the home network.

The FIGS. 7-9 are now considered in greater detail. FIG. 7 is a signal diagram illustrating the operation of the CSFB controller 40 discussed above according to embodiments of the present invention. As shown, the visited side signaling is provided in response to an incoming mobile terminated call arriving at GMSC 80. In response, the CSFB controller 72 pages MME 74 which in turn pages the handset 76 in order to locate the handset. The resulting location update sent by the handset 76 goes via the MSC 78 that happens to pick up the location update at the time and which will therefore manage the call. The signaling, including paging, receiving the update location and sending a PRN signal in reply makes up an emulation of HLR signaling for locating the handset and the MSC, but the HLR does not actively take part in the signaling.

On the other hand, the controller provides home side signaling to HLR/HSS 70 which is the HLR/HSS associated with the mobile handset supporting LTE 76. The home side signaling may be an emulation of signaling that would be received from a serving MSC.

The solution involves the CSFB controller 72, which is placed at a mobile core network.

The controller 72 may emulate the MSC/VLR, and thus receive the Provide Roaming Number (PRN) message. In response to the PRN message the apparatus then pages the MME to find which MME currently hosts the mobile handset on which the call is to terminate. Paging may initiate the CSFB scenario. The paging detects the telephone handset and sends back a location update signal via one of the network MSCs. The location update allows the CSFB Controller to detect the actual MSC and issue a new PRN towards the destination and specifically to the identified MSC, which then responds with a PRN response. The PRN response is then relayed to the HLR 70.

The controller may further provide a solution for the VPMN that eliminates the need for MTRF integration with the HPMN, and a solution for the VPMN that eliminates the need for RCH (Resume Call Handling) integration with the HPMN.

The present embodiments may not pass the ISUP IAM connection from the GMSC at the home network to the controller and thus the actual voice channel of the call is never taken up by the controller. Hence the controller can serve many more LTE subscribers, since there is no load due to voice channel.

Returning again to FIG. 7, there is shown the mobile terminated (MT) call flow according to one embodiment, where the mobile handset and the home location register can be in the same network or different networks. The HLR 70 initially queries the CSFB controller 72 for an MSRN, using the PRN MAP command, this being the normal procedure for an MT call. The CSFB controller 72 will not immediately allocate a number and return it as the PRN response, Instead, it may hold the PRN request, and issue a paging command to the MME 74, in order to locate the device 76. The paging may cause a CSFB procedure at the device, and may further cause a 3G registration of the device with a real MSC 78, via the standard Update Location procedure. It is noted that herein, the term 3G is used to denote 3G, GSM, CDMA and any legacy network type before upgrading to LTE.

The CSFB controller may monitor all 3G Update Locations relating to LTE devices, and hence is able to determine the identity of the real MSC.

Now the CSFB controller 72 may route the original and suspended PRN request to the real MSC 78, for call completion. The MSC 78 responds to the PRN by supplying the MSRN that is the number the MSC allocates in order to receive the call. The MSRN is returned to the CSFB controller 72, and then routed back to the HLR 70 for MT call processing.

The CSFB controller has signaling relay capabilities, being able to change the address of the MAP SS7 commands and also modify their content, if needed.

More particularly, the CSFB controller may be able to modify the MAP Update Location parameters. The CSFB controller may replace the real MSC address with the CSFB controller address, for every Update Location going to the HLR 70. The network may then route to the CSFB controller all Update Locations, and potentially other MAP commands, relating to LTE subscribers only. The LTE subscribers may for example be identified based on their use of a preset range of IMSI number. Similar identification procedures may be used with roaming traffic as well, to support LTE roamers. Update Location management is also related to MO (Mobile Originated) operations, that is both MO call and MO SMS, where Update Locations can be involved as part of the CSFB procedure. Hence the HLR may always have the CSFB controller address as the serving MSC for the LTE device.

Finally, the ISUP IAM signal, which is the initiation of the actual voice call, is passed on to the MSC 78, transferring the call. The call is at no time held by the CSFB controller 72.

In a further embodiment, in addition to being a signaling relay, the CSFB controller can act as a IWF/GLR (Global Location Registry, and may not in fact pass on certain Update Location information to the HLR, at the same time keeping the real MSC address in the IWF/GLR. The HLR may always have the CSFB controller address as the current MSC. Such IWF/GLR functionality may save international signaling. The IWF/GLR is known, and its relevance to the present embodiments is simply to do with whether the correct MSC address is sent to the home network or whether a single address—that of the IWF/GLR—is sent in all cases.

IWF/GLRIWF/GLRIWF/GLR

The CSFB controller stands between the HLR and GMSC on one side and the MSC and MME on the other side, giving each of them the signals they require without each side being aware that anything non-standard is going on at the other side. Thus, as explained, the CSFB controller 72 serves as a go-between that emulates one side to another in the signaling process, and the units on the respective sides do not therefore need to be upgraded. The CSFB controller, 72 IWF/GLR pretends to be the serving MSC. The incoming, that is mobile terminated (MT) message comes from the GMSC 80, and is passed to the HLR 70. The HLR 70 sends a PRN message as discussed above which, without knowing the actual MSC, gets passed to the CSFB controller 72. The CSFB controller obtains the PRN request but does not supply the required number straight away. Rather the CSFB controller first pages the handset, through the MSC 78 to the MME 74, and the handset is told to go to fallback. The updated location is sent via the CSFB controller to the HLR 70.

IWF/GLRIWF/GLR

It is noted that the update location from the MSC is not the same, or not necessarily the same, as that sent to the HLR. The CSFB controller 72 may send its own address to the HLR 70, and keep the real MSC address to itself IWF/GLR. It is further noted that mobile originated calls automatically register at the correct MSC on their way out, so the misalignment problem or the need to be located are not issues.

Reference is now made to FIG. 8 which illustrates how an embodiment of the present invention may work in the case of a roaming user. Dotted line 90 indicates connections crossing an international link. In the scenario shown, known as roaming forwarding, the visited network, to the left of line 90, is equipped with the MTRF prior art solution, however the home network, on the right of the line, is not. The IWF/IWF/GLR role here is to resolve the lack of MTRF at the home network.

More particularly, a call arrives from GMSC 92 and is referred to the HLR 94. HLR 94 sends a PRN message to the most recently reported VLR, which in this case is VLR1, 96. The call is passed to VLR1 using an ISUP-IAM message. VLR1 96 pages handset 98 via MME 100 and handset 98 provides a location update which happens to arrive at VLR2 102 which then attempts to inform the HLR via the MAP-UL referred to above. However the MAP-UL along with the MTRF indication is not supported at the home network and thus the home network does not learn about VLR2 102.

IWF/GLRIWF/GLRIWF/GLRIWF/GLRIWF/GLRIWF/GLR

In order to avoid this situation, IWF/GLR the CSFB controller, acting as an IWF/IWF/GLR 104, responds, as if it is the HLR 94, by telling VLR1 96 to pass over, or forward, control to the new VLR2 102, by sending a cancel message to VLR1 96 and, upon acknowledgement, sending a MAP-ISD message to VLR2 102. After registration to VLR2 is completed, VLR1 96 sends a MAP-PRN message to VLR2 which is acknowledged, and then an IAM message forwards the call from VLR1 to VLR2.

The IWF/IWF/GLR 104 thus interfaces with VLR2 102 and the HLR 94 is able to conduct the telephone call as required, despite the fact that there is no integration at the home network. Note that the IWF/IWF/GLR is not a standard IWF/GLR. The standard IWF/GLR is not capable of working with CSFallback and merely functions as a roaming HLR in the visited network.

Reference is now made to FIG. 9, which illustrates an alternative solution known as the roaming retry method. The roaming network has the resume call handling prior art method installed, but the home network lacks the necessary integration. Hashed line 110 indicates an international connection. A home network on one side of the link hosts home network GMSC 112 and HLR 114. A roaming network on the other side of the International link 110 hosts roaming handset 116. Roaming handset 116 is currently connected to MME 118 and there are two VLRs in the region, VLR2 120, and VLR1 122. IWF/IWF/GLR 124 is the interworking function which also carries the Gateway Location Registry function for roaming handsets on the network and roaming network GMSC 126 switches all queries concerning roamers to IWF/IWF/GLR 124.

Again, a mobile terminated call arrives at the home network GMSC 112 and HLR 114 is asked about the location of the handset. The HLR knows that the call destination handset 116 is roaming and it knows of IWF/GLR 124, to which it sends a PRN message. The IWF/IWF/GLR responds to the PRN message with a PRN response and provides an MSRN, MSRN1, as part of an ISUP-IAM message passing on the call to roaming GMSC 126. The IWF/IWF/GLR knows that the handset was last recorded at VLR1 122 and passes on a PRN message, getting a PRN response carrying MSRN2. The PRN is in fact the IWF/GLR's own PRN and not that originating from HLR 114, since this provides a way in which the IWF/GLR can control the call. On the other hand the IWF/GLR does not take the call and passes the roaming GMSC's ISUP-IAM signal on to VLR1 122. The IWF/GLRIWF/IWF/GLR takes up the INAP or Camel trigger also issued by the roaming GMSC 126 and thus stays in the control loop for the call. The call is in fact initially sent to VLR1 122 with the ISUP-IAM signal, but VLR1 realizes it does not have that particular handset and so pages the handset 116. The handset reacts by sending a location update to its MME 118 which then happens to be passed on to VLR2 120 as the handset 116 goes into CS fallback. IWF/GLR 124 receives the MAP-UL from VLR2 120 and now sends a Cancel IMSI signal to VLR1 122. The cancel IMSI is acknowledged by VLR1 which issues a resume call handling signal. In the prior art system the resume call handling system would go to the HLR 114 and cause the HLR to retrieve the call and then find VLR2 120, but the home network is not equipped for resume call handling and does not receive the signal. Rather the information is not passed to the HLR 114. The Resume call handling stops at the GMSC 126 of the visited network, which retrieves the call and sends an SRI signal causing IWF/GLR 124 to issue a MAP ISD signal to which a reply is received from VLR2. A MAP-UL from VLR2 120 informs the IWF/GLR 124 that VLR2 is the serving VLR and the IWF/GLR sends an SRI response to the GMSC 126. An IAM signal hands the call from roaming GMSC 126 to VRL2 120. Handset 116 then rings after receiving the alert signal. All this time the HLR 114 simply uses the address of the IWF/GLR and knows nothing about the change in VLR. Thus none of the delays involve the international link and no compatibility is required of the home network.

It is expected that during the life of a patent maturing from this application many relevant cellular telephony standards will be developed and the scope of terms such as 3G, GSM, CDMA and LTE are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Network apparatus for Long Term Evolution (LTE) support for calls using circuit-switch fallback (CSFallback), the apparatus comprising:
   a visited side signaling output configured to provide visited side signaling to respond to a mobile terminated call to a mobile handset supporting LTE by paging said mobile handset and causing said mobile handset to provide a location update via an mobile switching center (MSC), then finding the MSC based on location update signaling, the MSC thus being identified as currently serving said mobile handset, said visited side signaling comprising an emulation of home location register (HLR) signaling for locating said mobile handset and said MSC; and
   a home side signaling output, configured to provide home side signaling to an HLR associated with said mobile handset, said signaling comprising an emulation of signaling from a serving MSC; wherein said apparatus is configured to transfer said mobile terminated call for handling by said identified currently serving MSC;
   wherein said mobile handset is roaming in a network other than the network hosting the corresponding home location register, the visited side signaling output being configured to provide one of the group consisting of: signals to initially forward said mobile terminated call to a known MSC, and subsequently, if said known MSC is found to be other than said currently serving MSC, to forward control of said mobile terminated call from said known MSC to said currently serving MSC, or a roaming number request to a currently known serving visitor location register (VLR) and to forward a call thereto, and in the event of a location update coming from said telephone handset arriving via a different VLR, sending a cancel signal to said currently known serving VLR to retrieve said call, and cause said currently known VLR to communicate with said different VLR, said apparatus then configured to forward said call to said different VLR.

2. The network apparatus of claim 1, wherein said visited side signaling output is configured to trigger an update location from said mobile handset to find said currently serving MSC.

3. The network apparatus of claim 1, having an apparatus network address, and wherein said home side signaling output is configured to provide said apparatus network address as a serving MSC address to said HLR and to retain an actual serving MSC address for use by said visited side signaling output.

4. The network apparatus of claim 1, having an apparatus network address which is preset at said HLR, and retaining an actual serving MSC address for use by said visited side signaling output.

5. The network apparatus of claim 1, configured to respond to said call by withholding a provide roaming number (PRN) request, paging said mobile handset to determine a serving MSC and then providing to said determined serving MSC one member of the group consisting of a delayed version of said PRN request and a new PRN request, prior to said transferring said call.

6. Method for providing long term evolution (LTE) support for calls using circuit-switch fallback (CSFallback), the method comprising:
   providing visited side signaling to respond to a mobile terminated call to a a mobile handset supporting LTE by paging said handset and causing said mobile handset to send an update location, then finding the mobile switching center (MSC) based on location update signaling, said update location said identifying an MSC as currently serving said mobile handset, said visited side signaling comprising an emulation of HLR signaling for locating said mobile handset and said MSC;
   providing home side signaling to an home location register (HLR) associated with said mobile handset supporting LTE, said signaling comprising an emulation of signaling from a serving MSC; and
   providing said call to said currently serving MSC;
   providing a register at a first network, wherein said mobile handset is roaming in said first network, said first network being a network other than a network hosting the corresponding home location register;
   forwarding said call via a currently serving MSC; receiving an update location from said mobile handset;
   noticing that said update location indicates an MSC which is different from a currently serving MSC; and
   providing signals to cancel said currently serving MSC and cause said currently serving MSC to forward control of said mobile terminated call to said different MSC;
   providing a register at a first network, wherein said mobile handset is roaming in said first network, said first network being a network other than a network hosting the corresponding home location register;
   providing a provide roaming number (PRN) request to a currently known serving MSC;
   on acknowledgement of said PRN request, forwarding said call to said currently serving MSC; and in the event of a location update coming from said mobile handset supporting LTE arriving via a different MSC:
sending a cancel signal to said currently known serving MSC;
retrieving said call;
signaling said different MSC to assume control of said mobile terminated call;
and forwarding said retrieved call to said different MSC.

7. The method of claim 6, wherein said visited side signaling triggers an update location from said mobile handset to find said currently serving MSC.

8. The method of claim 6, comprising:
providing a predetermined first network address as a serving MSC address to said HLR; and
retaining an actual serving MSC address for said visited side signaling.

9. The method of claim 6, comprising: providing a register;
providing a register address that is preset at said HLR; and
retaining an actual serving MSC address for said visited side signaling.

10. The method of claim 6, further comprising:
responding to said call by withholding a provide roaming number —PRN— request; paging said mobile handset supporting LTE to determine a serving MSC; and providing said PRN request after delay to said determined serving MSC or providing a new PRN request to said determined MSC.

* * * * *